(12) United States Patent
Sung et al.

(10) Patent No.: US 9,264,467 B2
(45) Date of Patent: Feb. 16, 2016

(54) METHOD, USER EQUIPMENT, AND SYSTEM FOR OPENING AN AD-HOC POC SESSION IN A POC SYSTEM

(75) Inventors: Sang-Kyung Sung, Seoul (KR); Wuk Kim, Gwacheon-si (KR); Sung-Jin Park, Suwon-si (KR); Ji-Hye Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 2736 days.

(21) Appl. No.: 11/603,856

(22) Filed: Nov. 22, 2006

(65) Prior Publication Data

US 2007/0129051 A1 Jun. 7, 2007

(30) Foreign Application Priority Data

Nov. 23, 2005 (KR) .................. 10-2005-0112557
Nov. 22, 2006 (KR) .................. 10-2006-0115693

(51) Int. Cl.
| | | |
|---|---|---|
| *H04L 29/06* | (2006.01) | |
| *H04W 76/00* | (2009.01) | |
| *G06F 15/16* | (2006.01) | |
| *H04W 4/10* | (2009.01) | |
| *H04W 8/26* | (2009.01) | |
| *H04W 72/00* | (2009.01) | |
| *H04W 84/04* | (2009.01) | |
| *H04W 84/18* | (2009.01) | |

(52) U.S. Cl.
CPC ........ *H04L 65/4061* (2013.01); *H04L 65/1006* (2013.01); *H04L 65/1069* (2013.01); *H04W 76/005* (2013.01); *G06F 15/16* (2013.01); *H04W 4/10* (2013.01); *H04W 8/26* (2013.01); *H04W72/00* (2013.01); *H04W 84/042* (2013.01); *H04W 84/18* (2013.01)

(58) Field of Classification Search
CPC ............ H04L 65/4061; H04L 65/1069; H04L 65/1006; H04W 76/005; H04W 4/10; H04W 8/26; H04W 84/042; H04W 72/00; H04W 84/18; H04W 4/08; H04W 84/08; H04W 8/18; G06F 15/16
See application file for complete search history.

(56) References Cited

U.S. PATENT DOCUMENTS

| | | | |
|---|---|---|---|
| 2004/0190468 A1* | 9/2004 | Saijonmaa ................. | 370/312 |
| 2005/0032538 A1 | 2/2005 | Noel et al. | |
| 2005/0141464 A1 | 6/2005 | Willey et al. | |
| 2005/0186970 A1 | 8/2005 | Yates et al. | |
| 2006/0046757 A1 | 3/2006 | Hoover et al. | |

FOREIGN PATENT DOCUMENTS

| | | |
|---|---|---|
| CN | 1582013 | 2/2005 |
| EP | 1 505 844 | 2/2005 |
| EP | 1 935 134 | 6/2008 |
| JP | 2007-513590 | 5/2007 |
| WO | WO 2005/074356 | 8/2005 |
| WO | WO2005104594 | * 11/2005 |

OTHER PUBLICATIONS

OMA, Push to talk over Cellular (PoC)—Architecture, Nov. 4, 2005.*
OMA, Group Management Architecture, Draft Version 1.0, Open Mobile Alliance OMA-PAG-GM-AD-V1_0-20041118-D, Nov. 18, 2004.

* cited by examiner

*Primary Examiner* — Jae Y Lee
*Assistant Examiner* — Axia Guadalupe-Cruz
(74) *Attorney, Agent, or Firm* — The Farrell Law Firm, P.C.

(57) ABSTRACT

A method, user equipment, and system are provided which can open an ad-hoc Push-To-Talk (PTT) over Cellular (PoC) session for a call target group whose group identifier is managed in a remote network domain when the ad-hoc PoC session is opened. A PoC client requesting session initiation sends, to a first PoC server of a home network, a session INVITE message containing information of at least one group identifier. The first PoC server checks the group identifier information and sends a group list information request message to a second PoC server hosting a group identifier when identifier information of a network group other than the home network is included. The second PoC server acquires list information about a group in the request message and sends the information to the first PoC server.

22 Claims, 10 Drawing Sheets

HD
```
INVITE sip:conf-fact@example.com SIP/2.0
Via: SIP/2.0/TCP client.samsung.example.com;branch=z9hG4bKhjhs8ass83
Max-Forwards: 70
To: Conf Factory <sip:conf-fact@example.com>
From: SSK <sip:ssk@samsung.example.com>;tag=32331
Call-ID: d432la84b4c76e66710
CSeq: 1 INVITE
Contact: SSK <sip:ssk@client.samsung.example.com>
Accept-Contact: +g.poc.talkburst;explicit;require
Allow: INVITE, ACK, CANCEL, OPTIONS, BYE, REFER, SUBSCRIBE, NOTIFY
Allow-Events: dialog
Accept: application/sdp, message/sipfrag
Require: recipient-list-invite
Content-Type: multipart/mixed;boundary="boundary1"
Content-Length: ...
```

BODY

SDP
```
--boundary1
Content-Type: application/sdp v=0
o=carol 2890844526 2890842807 IN IP4 chicago.example.com
s=-
c=IN IP4 192.0.2.1
t=0 0
m=audio 20000 RTP/AVP 0
a=rtpmap:0 PCMU/8000
m=video 20002 RTP/AVP 31
a=rtpmap:31 H261/90000
```

LIST
```
--boundary1
Content-Type: application/resource-lists+xml
Content-Disposition: recipient-list <?xml version="1.0" encoding="UTF-8"?>
<resource-lists xmlns="urn:ietf:params:xml:ns:resource-lists"
        xmlns:xsi="http://www.w3.org/2001/XMLSchema-instance">
  <list>
    <entry uri="sip:sipark@samsung.example.com;session=1-1" />
    <entry uri="sip:ktloe@samsung.example.com;session=1-1" />
    <entry uri="sip:OMA_KTF@samsung.example.com;session=prearranged" />
    <entry uri="sip:OMA_SKT@example.domain_b.net;session=prearranged" />
    <entry uri="sip:OMA_TMO@example.domain_x.net;session=prearranged" />
  </list>
</resource-lists>
--boundary1--
```

FIG.8

```
           INVITE sip:OMA_TMO@example.domain_x.net SIP/2.0
           Via: SIP/2.0/UDP client.samsung.example.com;branch=z9hG4bKh|hs8|kk21
           Max-Forwards: 70
           To: PoC Group X <sip:poc_group_x@example.networkx.com>
           From: sip:poc_serv_a@samsung.example.com;tag=57341
           Call-ID: d432fa84b4c76e52634
           CSeq: 68 INVITE
     HD    Contact: sip:conf_url_a@conf.samsung.example.com;isfocus;session=adhoc
           Allow: INVITE, ACK, CANCEL, OPTIONS, BYE, REFER, SUBSCRIBE, NOTIFY
           Allow-Events: dialog
           Accept-Contact: +g.poc.talkburst;require;explicit
           Accept: application/sdp, message/sipfrag
           Content-Type: multipart/mixed;boundary="boundary1"
           Content-Length: ...

S  --boundary1
        D  Content-Type: application/sdp
        P  ...
           < MIME type SDP offer >
           ...
           --boundary1
           Content-Type: application/resource-lists+xml
           Content-Disposition: recipient-list <?xml version="1.0" encoding="UTF-8"?>
  BODY     <resource-lists xmlns="urn:ietf:params:xml:ns:resource-lists"
     L                xmlns:xsi="http://www.w3.org/2001/XMLSchema-instance">
     I       <list>
     S        <entry uri="sip:sjpark@samsung.example.com;session=1-1" />
     T        <entry uri="sip:ktlee@samsung.example.com;session=1-1" />
              <entry uri="sip:klsu@ktf.example.com" />
              <entry uri="sip:kimyk@ktf.example.com" />
              <entry uri="sip:leejs@ktf.example.com" />
              <entry uri="sip:kimwuk@SKT.domain_b.net" />
              <entry uri="sip:limsml@SKT.domain_b.net" />
             </list>
           </resource-lists>
           --boundary1--
```

FIG.9

```
SIP/2.0 302 Moved Temporarily
     Via: SIP/2.0/UDP serv_client.tmo.example.com
     Via: SIP/2.0/UDP client.samsung.example.com
        ;branch=z9hG4bKhjhs8mvo99;received=192.0.2.4
     To: PoC Group X <sip:poc_group_x@example.networkx.com>;tag=47823
     From: sip:poc_serv_a@samsung.example.com;tag=57341
     Call-ID: d432fa84b6didx710
     CSeq: 42 INVITE
     Contact: <sip:poc_server_x@example.networkx.com>
     Allow: INVITE, ACK, CANCEL, OPTIONS, BYE, REFER, SUBSCRIBE, NOTIFY
     Allow-Events: dialog, conference
     Accept: application/recipient-list+xml, message/sipfrag
     Supported: recipient-list
     Conten-Type: multipart/mixed;boundary="boundary1"
     Content-Length: ...
```

HD = header block above

SDP:
```
--boundary1
...
--boundary1
```

BODY / LIST:
```
     Content-Type: application/resource-lists+xml
     Content-Disposition: recipient-list <?xml version="1.0" encoding="UTF-8"?>
     <resource-lists xmlns="urn:ietf:params:xml:ns:resource-lists"
           xmlns:xsi="http://www.w3.org/2001/XMLSchema-instance">
     <list>
           <entry uri="sip:john@example.tmo.com" />
           <entry uri="sip:bill@example.tmo.com" />
           <entry uri="sip:stephane@example.tmo.net" />
           <entry uri="sip:mark@example.tmo.com" />
     </list>
     </resource-lists>
--boundary1
```

FIG.10

METHOD, USER EQUIPMENT, AND SYSTEM FOR OPENING AN AD-HOC POC SESSION IN A POC SYSTEM

PRIORITY

This application claims priority under 35 U.S.C. §119 to an application entitled "Method, User Equipment, and System for Opening an ad-hoc PoC Session in a PoC System" filed in the Korean Intellectual Property Office on Nov. 23, 2005 and assigned Serial No. 2005-112557 and filed Nov. 22, 2006 and assigned Serial No. 2006-115693, the contents of both of which are incorporated herein by reference.

BACKGROUND OF THE INVENTION

1. Field of the Invention

The present invention relates generally to a method, user equipment, and system for opening an ad-hoc Push-To-Talk (PTT) over Cellular (PoC) session in a PoC system, and more particularly to a method, user equipment, and system that can open an ad-hoc PoC session for a call target group whose group Identifier (ID) is managed in a remote network domain when the ad-hoc PoC session is opened.

2. Description of the Related Art

With the significant development of mobile communication and extension of communication networks, various extended services and applications using mobile phones are being provided. Due to user demands, services beyond the basic call service such as positioning, multimedia and Push-To-Talk (PTT) services, are being provided. Specifically, the PTT service supports various additional functions such as instant messenger and state display, as well as a group call and a voice call that are possible in a conventional radio system or a Trunked Radio System (TRS).

A concept of this PTT service is being actively discussed to standardize a PTT over Cellular (PoC) service using a mobile communication network. One characteristic that distinguishes the PoC service from the conventional mobile communication service is that users can perform communication while moving between multiple sessions as needed. The requirement that users should be able to perform communication while moving between multiple sessions is prescribed in the standard of the Open Mobile Alliance (OMA) serving as an organization for developing a standard for a mobile communication service.

This OMA PoC technology exploits a Session Initiation Protocol (SIP)/SIP extension protocol corresponding to a typical application layer protocol for controlling Internet Protocol (IP) multimedia telephony in order to deliver session participation information of a group call and exploits an Extensible Markup Language (XML) Configuration Access Protocol (XCAP) for managing group information.

A PoC spec currently being standardized by the OMA includes a PoC service that supports a multiparty conference function of a half-duplex communication scheme and supports various types according to purpose of a group. That is, PoC conferences are classified into ad-hoc, prearranged and chat PoC groups according to characteristics of a participating group.

An ad-hoc group call and a prearranged group call open a dial-out session by a client sending a session open request to a server acting as a focus (hereinafter conference server) and the conference server sends a session request to respective clients belonging to a group.

A chat group call has characteristics of a session open and join procedure in which clients have dial-in access to a conference server of a chat group when they recognize in advance associated session identification information or group session information provided through group advertising.

To open a PoC multimedia session, a PoC call requester at a transmitting side makes a request for processing a call by sending a multimedia INVITE message using the SIP. At this time, the multimedia INVITE message can include various formats of audio, video, text, and so on according to media types. A receiving side performs various answer procedures according to presence of a prearranged session and answer mode setting.

To process a PoC call, a PoC Client A at the transmitting side sends an SIP INVITE message containing SIP address information of a target receiver to an associated SIP/IP core network A. The SIP INVITE message contains elements of PoC address information of the client sending a call request, required media parameters, and characteristic value information indicating the PoC service. The SIP INVITE message is delivered to a Participating PoC server (or Participating PoC Function (PF) entity) through an associated IP Multimedia Subsystem (IMS) server (of a Proxy-Call Session Control Function (P-CSCF) and Serving-Call Session Control Function (S-CSCF)) using a path query in a Dynamic Host Configuration Protocol (DHCP) server or Domain Name Server (DNS). When a multimedia session is requested, the required media parameters include a plurality of characteristic values indicative of parameters such as an audio and video encoding method, rate and payload type.

When a basic call request is made, the PF entity connected to a PoC user can be implemented which is separated from the controlling PoC server (or Controlling PoC Function (CF) entity) for managing a talk burst of an opened session. The SIP INVITE message sent to the PF entity is transferred to the CF entity through the associated SIP/IP core network.

A PoC session control network with the CF receives a response message from a network at the receiving side after transferring an SIP INVITE message to the network at the receiving side. The SIP response message from the network at the receiving side can be a provisional response message of 1XX, a successful response message of 2XX, or an error response message of 4XX~6XX according to setting of the PF and the PoC client at the receiving side. In the case of the automatic answer mode, an SIP 183 "session progress" signal can be received, through which a connection between the PoC server and client can be established in the IMS network of a call requester. A call acknowledgment signal of the PoC client at the receiving side is returned as an SIP 183 "session progress" signal or an SIP 200 "OK" response, and is transferred to the PoC client A through the PoC server of the CF and PF.

After receiving the SIP 200 "OK" response or the SIP 183 "session progress" signal from the PoC server at the receiving side, the CF entity determines that a PoC call has been connected and sends a floor granted signal for assigning the floor for a talk burst to the PoC client A. The response of the SIP 200 "OK" or 183 "session progress" signal can be classified as a "confirmed" or "unconfirmed" response. The CF entity requires a buffering function when the "unconfirmed" response is received.

The PoC client A at the transmitting side receives a talk burst transmission granted signal, for example, a floor granted signal for transferring call connection sound, through a Real Time Control Protocol (RTCP) after receiving the response signal to the SIP INVITE message. The floor granted signal is generated from the CF entity having the right to arbitrate a talk burst and is sent to the PoC client through the PF entity for managing an associated PoC client. Since the floor granted signal uses a bearer path without the SIP, it can be sent without passing through the SIP/IP core network such as the IMS. When identifying the call connection sound, the PoC user sends a media stream (or a typical voice stream) using a Real-time Transport Protocol (RTP).

As defined in the PoC 1.0 standard document, an ad-hoc PoC group session can be opened according to edition of the PoC client at the transmitting side. At this time, target PoC address information mapped to an ad-hoc group is constructed with a single SIP or TEL Uniform Resource Identifier (URI). According to function for opening a flexible ad-hoc group session newly defined in the PoC 2.0 standard, a call target group can have a group URI rather than a single URI.

For this, the PoC client at the transmitting side can open the flexible ad-hoc group session by including a group type indicator for the group URI in a message to be sent to open the ad-hoc PoC group session and performing a session procedure. In this case, when a call target group URI is managed in a domain equal to that of a PoC server operating as the CF entity in an ad-hoc session, an ad-hoc group session management server can open the ad-hoc group session by receiving information of clients mapped to an associated group identifier from a PoC XML Document Management Server (XDMS).

However, when the call target group URI is not managed in a domain (hereinafter a home network domain) equal to that of the PoC server operating as the CF entity in the ad-hoc session, the ad-hoc group session management server cannot receive client information mapped to an associated group from a PoC XDMS within a different domain. That is, the ad-hoc group session management server should send a session invitation to associated clients by directly collecting a list of clients belonging to a remote network other than the home network. Conventionally, a method for efficiently opening a flexible ad-hoc group session is not provided for when a call target group identifier used to open an ad-hoc session is not managed in a PoC server within a home network domain or a connected PoC XDMS.

SUMMARY OF THE INVENTION

It is, therefore, an object of the present invention to provide a method, user equipment, and system for opening an ad-hoc PoC session in a PoC system that can acquire a client list mapped to a group URI from an associated network if the client list mapped to a target URI of the ad-hoc group is not managed in a PoC server within a home network domain when a PoC ad-hoc group session is opened.

It is another object of the present invention to provide a method, user equipment, and system for opening an ad-hoc PoC session in a PoC system that can receive associated group information from a PoC server for managing an ad-hoc group session if a group URI is managed in a network domain different from that of a group session initiator when the PoC ad-hoc group session including single and group URIs is opened.

In accordance with the present invention, there is provided a method for opening an ad-hoc PoC session in a PoC system, including sending a session INVITE message from a PoC client requesting session initiation to a first PoC server of a home network, the session INVITE message including information of at least one group identifier, checking the group identifier information within the session INVITE message received by the first PoC server and sending a group list information request message to a second PoC server hosting a group identifier when there exists identifier information of a group of a network other than the home network, and acquiring list information about a group included in the group list information request message and sending the acquired group list information to the first PoC server.

In accordance with the present invention, there is provided a system for opening an ad-hoc PoC session in a PoC system, including a PoC client for requesting session initiation and sending a session INVITE message including information of at least one group identifier, a first PoC server for checking the group identifier information within the session INVITE message received from the PoC client and sending a group list information request message to an associated server hosting a group identifier when there exists identifier information of a group of a network other than a home network, and a second PoC server for receiving the group list information request message from the first PoC server, acquiring list information about a group included in the group list information request message, and sending the acquired group list information to the first PoC server.

In accordance with the present invention, there is provided a user equipment for opening an ad-hoc PoC session in a PoC system, including a data transceiver for transmitting packet data to and receiving packet data from a PoC server, and a controller for transmitting a session INVITE message including at least one URI and a group identifier for opening a PoC ad-hoc group session.

BRIEF DESCRIPTION OF THE DRAWINGS

The above and other objects and aspects of the present invention will be more clearly understood from the following detailed description taken in conjunction with the accompanying drawings, in which:

FIG. 8 illustrates an example of the format of an SIP INVITE message for opening the ad-hoc PoC session in FIG. 6;

DETAILED DESCRIPTION OF THE PREFERRED EMBODIMENTS

Preferred embodiments of the present invention will be described in detail herein below with reference to the accompanying drawings. In the following, there will be described an example in which the present invention is applied to a PoC system for a PTT service using a cellular mobile communication network among PTT systems. Conventionally, the PoC system exploits a conventional SIP or extension SIP corresponding to a typical application layer protocol for controlling IP multimedia telephony in order to deliver session participation information of a group call and exploits an Extensible Markup Language (XML) Configuration Access Protocol (XCAP) for acquiring group information. Functions of the present invention as described below can be implemented by the above-described protocols.

Figure 1:
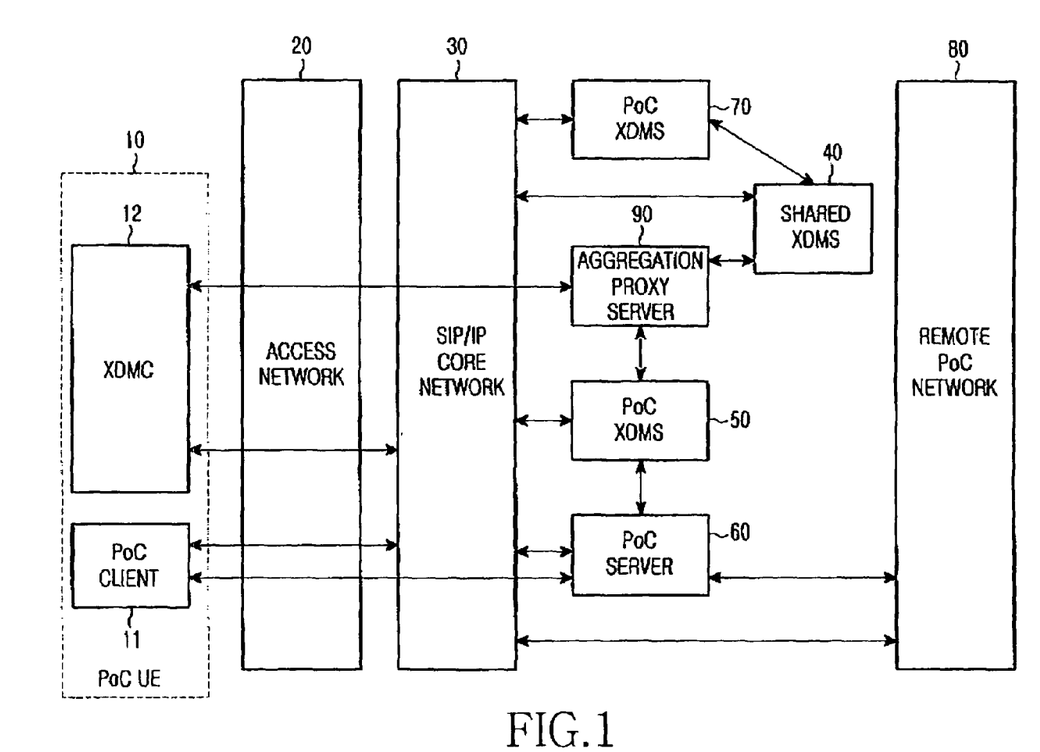
FIG. 1 illustrates a structure of a conventional PoC service system and an associated network structure.

FIG. 1 is a conceptual diagram illustrating a conventional PoC service system and an associated network structure, to which the present invention is applied. Referring to FIG. 1, a PoC client 11 is a service requester embedded in a PoC UE 10. The PoC client 11 is connected to an SIP/IP core network 30 serving as a core network for supporting SIP and IP multimedia through an access network 20. The PoC client 11 can access a PoC service while residing in the PoC UE 10. The PoC client 11 functions to generate, participating in or end a PoC session. Also, the PoC client creates, processes and transfers a media burst, supports an instant personal alert, authenticates a connection to the PoC service and subscribes to presence information, among other functions.

To support the PoC service, the SIP/IP core network 30 is connected to a PoC server 60, a PoC XDMS 50 and a PoC XDMS 70. The PoC server 60 can perform a controlling PoC function (CF) for maintaining and managing a PoC session or a participating PoC function (PF) for supporting the PoC client desiring to participate in a PoC session opened in a different network domain.

The PoC service can be accompanied with a service for opening a group session as in a conference call. For this, the OMA standard defines an XML Document Management Client (XDMC) and an XDMS for a group list service. In FIG. 1, the XDMC residing within the PoC UE 10 is an XDMC 12. The XDMS can be classified into the PoC XDMS 50 corresponding to a particular server for the PoC service and a shared XDMS 40 commonly available in other service enablers. When a group list-related request is received from the XDMC 12, an aggregation proxy server 90 routes the received request to each XDMS according to proper rule.

Figure 2:
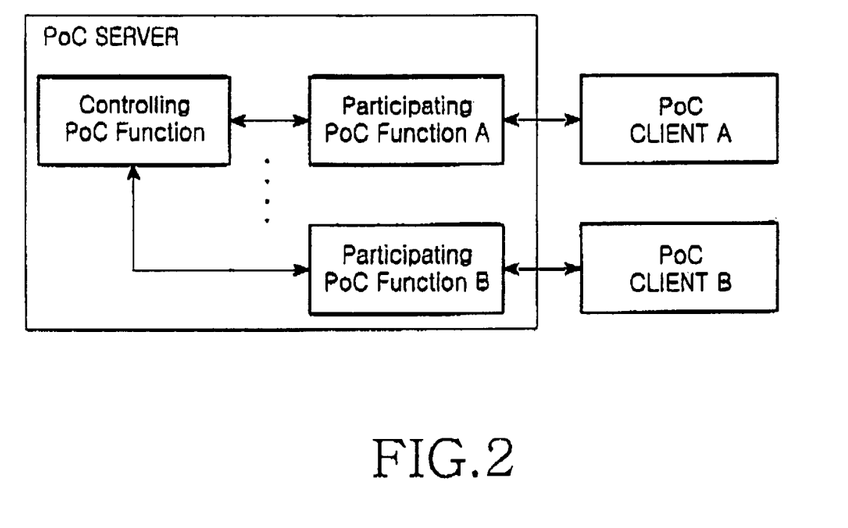
FIG. 2 illustrates a structure of a conventional PoC server.

FIG. 2 illustrates a conventional PoC server. Functions of the PoC server are divided into a CF for maintaining and managing the overall PoC session and a PF responsible for maintenance and management between sessions. These functions will be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc
Provides policy enforcement for participation in group sessions
Provides the participants information
Collects and provides centralized media quality information
Provides centralized charging reports
May Provide transcoding between different codecs
Support Talk Burst Control Protocol Negotiation Referring to Table 1, the CF performs, among functions of the PoC server, a function that serves to manage the overall PoC sessions, particularly to receive, sequence and authorize the right-to-speak (or floor) requests of the PoC clients, to distribute a talk burst requested by an arbitrary PoC client to all the other PoC clients participating in group calling, and to provide information of the PoC clients participating in the group calling.

Referring to Table 2 below, the PF serves to manage the sessions that are linked with the CF and the respective PoC clients in the PoC session. In particular, the PF serves to relay the right-to-speak when the PoC client requests the right-to-speak or when the right-to-speak is assigned to the PoC client in the CF. Moreover, the PF serves to relay media between the CF and the PoC client, to perform transcoding when different codecs are used between the CF and the PoC client, and to filter any one of two simultaneous sessions in response to the PoC client's selection when the PoC client participates in one session while participating in the other session.

TABLE 2

Participating PoC Function (PF)

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc, on behalf of the represented PoC Client
Provides policy enforcement for incoming PoC session (e.g., access control, incoming PoC session barring, availability status, etc)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client In the PoC system configured as described above, a PoC user can input information about a group and group members to the PoC XDMS 50 through its own UE and can learn information about PoC users capable of being called thereby through an individual or group list received from the PoC XDMS 50. In another method capable of generating, correcting and managing a group and group members in the PoC XDMS 50, information can be input through the XDMC implemented in a reliable communication network such as the Internet and an Intranet.

To use a PoC call service, a PoC user registers his/her own PoC address in the SIP/IP core network, which stores information about the PoC user in response to a request. Thus, when another PoC user attempts a PoC group call, his/her own information is first registered in the SIP/IP network and a call request is sent to the SIP/IP core network using group identification information received from the PoC XDMS 50. Then, the SIP/IP core network transfers the PoC call request to a home PoC server in which the PoC user making the call request is registered after address and domain position decision processes using information of the PoC user making the call request. The PoC server prepares to open a PoC session in response to the PoC call request, and transfers a call request signal to an associated SIP/IP core network after acquiring user information from the PoC XDMS. In the case of the call request for users within an intra-domain, the PoC server performs both the PF and CF. The PoC server for managing a PoC user for receiving the call request sends the call request to the associated PoC user after a position decision process of the SIP/IP core network using its own received PoC user information.

Figure 3:
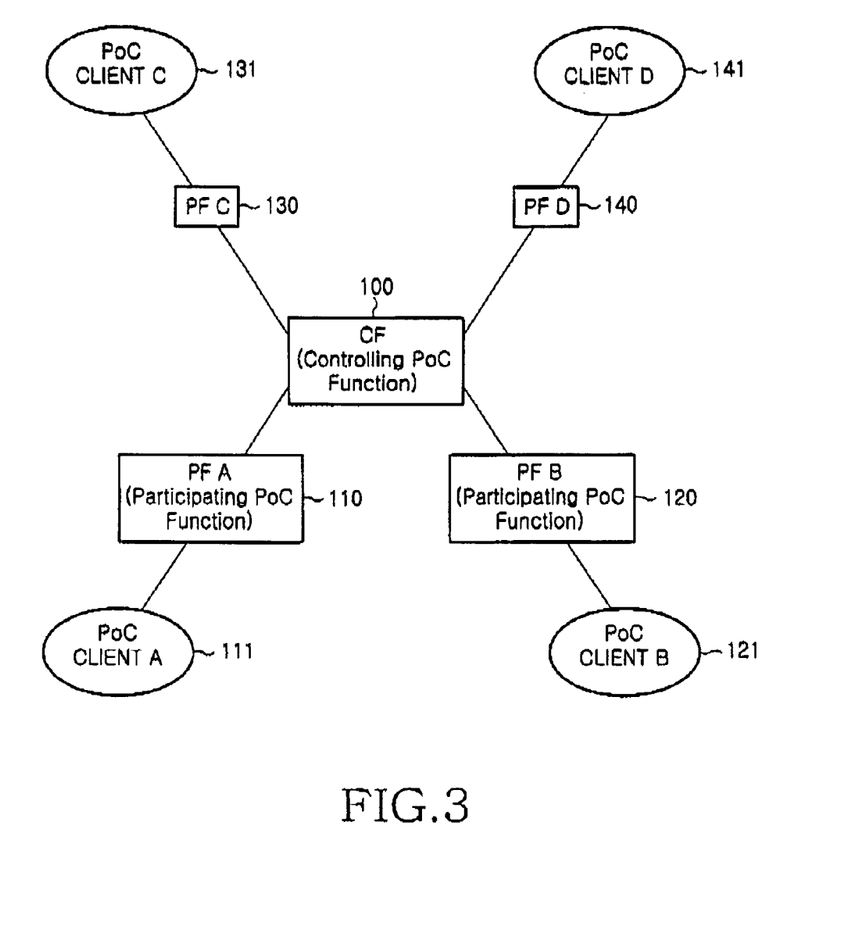
FIG. 3 illustrates a controlling PoC function block and a participating PoC function block of a PoC server in accordance with the present invention.

FIG. 3 illustrates a CF block and a PF block of the PoC server. Referring to FIG. 3, PoC clients 111, 121, 131, and 141 access a CF 100 through PFs 110, 120, 130, and 140 to set up a PoC session. For PoC clients having the floor assigned by the CF 100 to speak, media are provided to the respective PoC clients. At this time, the PoC client having the floor can speak after identifying information of participants in a group session.

The call processing technology for a call connection in the PoC system can perform various procedures according to requests and situations of transmitting and receiving sides. Characteristics of the PoC system required by the OMA according to settings of the transmitting and receiving sides are as follows.

First, the receiving side can set its own answer mode according to the PoC user's request. The answer mode can be divided into automatic and manual answer modes. In the automatic answer mode, a receiver immediately sends the answer from an associated network to the transmitting side instead of the manual answer when an associated PoC client is included in a PoC client list designated by the receiving side. The network can automatically send the answer in place of the UE because the PoC server has a function for performing the answer mode and storing an associated user list according to an answer-mode setting request of the UE. The manual answer mode operates when an associated user is unclear or is not included in a user list relative to the automatic answer mode, or when the receiver sets the manual answer mode for all users. A PoC call request is sent to the user's UE through a receiving network and a call connection is established by permission of the PoC user.

Second, the PoC system classifies session modes into on-demand and pre-established session modes according to connection setup with the PoC server within a home network of a user. The pre-established session mode is technology for pre-establishing a session between the PoC client and the PoC server belonging to the home network thereof in response to the PoC user's request. This pre-established session is necessary to quickly open a session when the PoC user pre-negotiates media parameters to be later used with the PoC server without re-negotiating the media parameters with the PoC server. For the pre-established session, the PoC client provides supportable media parameters to a body, i.e., a Session Description Protocol Multipurpose Internet Mail Extensions (SDP MIME) body, in an SIP INVITE method, and provides and responds to media parameters received from the server. A response message from the server includes identification information of a newly pre-established session and a conference URI and is returned to the PoC user. When the above-described pre-established session is used, pre-negotiation can be performed for an IP address, a port number, a codec to be used and a talk burst control protocol, among other parameters. The on-demand session mode indicates a state in which PoC users do not set up a pre-established session. In the on-demand session mode, a PoC call connection procedure is performed after receiving an INVITE message from another PoC user.

The answer mode set for a call request in the PoC system can be stored in both the PoC server serving as the network element and the PoC client serving as the user's UE. When the answer mode is set in the home network for managing the PoC client, it is implemented in the PoC server for performing the PF within the home network to which the PoC client belongs. When the answer mode is set in the network, the PF immediately and automatically sends a response of a session progress message to a call request network when a PoC call request is received from a different PoC server. Thus, if the automatic answer mode is set, it has a simpler call request procedure than when a response is made after a session setup message is transferred to the PoC client. Thus, an initial floor assignment time is reduced. Because a result different from the user's response intention can occur according to when the automatic answer is made in the network, the answer mode can also be set in the PoC client. At this time, a priority of the answer mode of the PoC client is higher than that of the answer mode set in the network. This is to address a privacy problem when the answer mode is not reflected in real time due to a signal delay or error in a radio access network or IP core network if the PoC client changes its own answer mode and sends an answer mode update request to the PoC server. The PoC service can set the answer mode of the user in both the PoC server and client. The answer mode is decided by the PoC client considering the most recent intention of the user. According to this decision, a media stream (of actual voice or video of the user) can be transferred.

Figure 4:
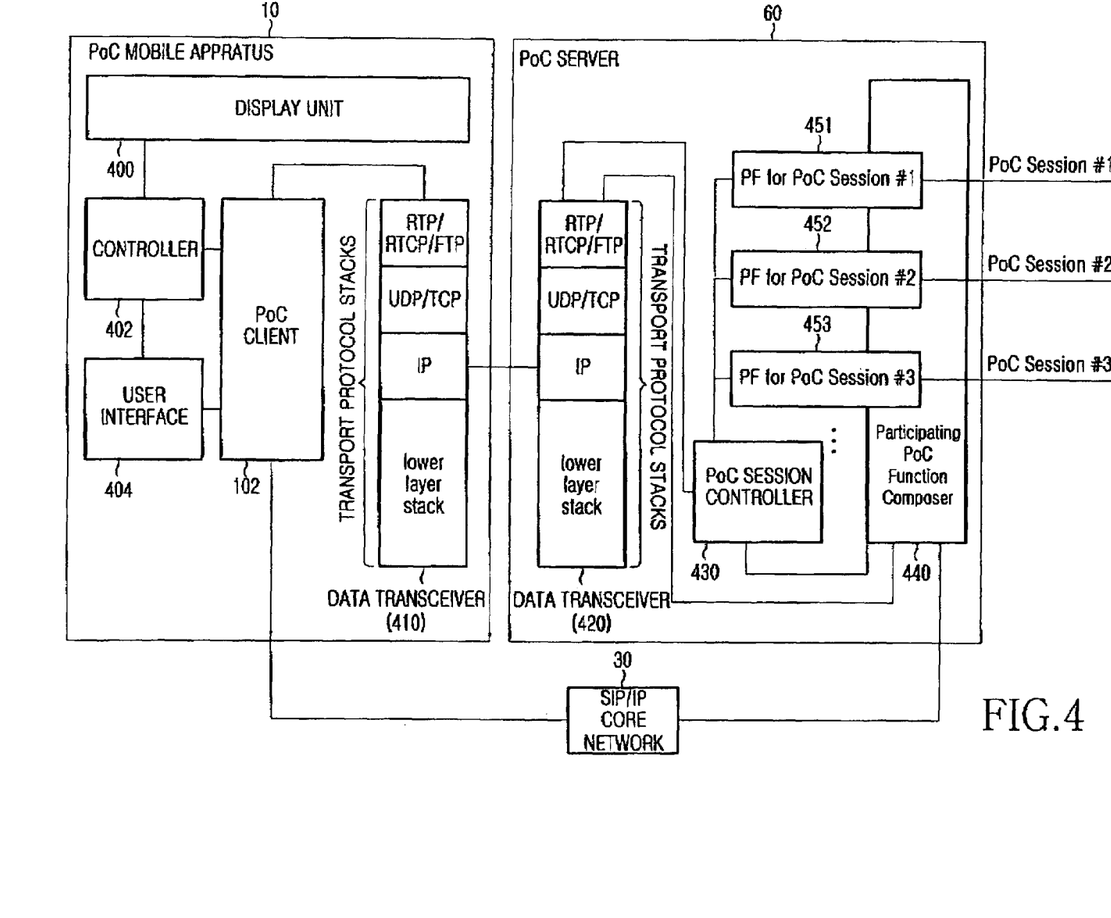
FIG. 4 illustrates internal structures of a PoC UE and an ad-hoc PoC group server for opening an ad-hoc PoC session including a plurality of single and group URIs in accordance with the present invention.

The basic structure of the present invention is provided with the conventional PoC system, i.e., a UE with a PoC client function, a PoC server for managing multiple sessions, and sub networks (e.g., an SIP/IP core network and a radio access network) for connecting both ends thereof FIG. 4 is a block diagram illustrating the PoC UE 10 and the PoC server 60 in accordance with the present invention.

As illustrated in FIG. 4, the system of the present invention is provided with the PoC UE 10, the PoC server 60 and an SIP/IP core network 30. In accordance with the present invention, the PoC server 60 can perform the CF or PF according to possession of a group session. However, the present invention considers only the CF because an ad-hoc session is opened in response to a request of a session initiator. The CF entity for opening the ad-hoc session can perform the PF for an actual session initiation client.

The PoC server 60 is provided with a data transceiver 420, a PoC session controller 430 and a PF composer 440.

In the PoC server 60, the data transceiver 420 can include transport protocol stacks for transmitting and receiving packet data. The data transceiver 420 can include a Real-time Transport Protocol/Real Time Control Protocol/File Transfer Protocol (RTP/RTCP/FTP) stack, User Datagram Protocol/Transport Control Protocol (UDP/TCP) stack, IP stack and lower layer stack.

When receiving an ad-hoc session open request from the PoC client, the PoC session controller (or simultaneous session controller) 430 sends a group list information request to a PoC XDMS within its network domain or an XDMS within a remote network domain according to associated group URI.

The PF composer 440 serves as the component used to support and manage multiple sessions. This PF composer 440 transfers media data received through the multiple sessions 451, 452, and 453, to the simultaneous session controller 430.

The PoC server 60 is connected to the PoC client 102 through the SIP/IP core network 30 for supporting SIP based communication.

The PoC UE 10 is configured with the PoC client 102, a display unit 400, a controller 402, a user interface 404 and a data transceiver 410.

The PoC client 102 selects groups through an SIP message and sends an ad-hoc session request to the PF composer 440. Further, the PoC client 102 uses a PoC service while controlling the controller 402 and controls multimedia supporting the SIP. The display unit 400 outputs visual media such as an image and video received from the PoC server 60. The controller 402 processes data to output received data to the display unit 400. The user interface 404 transfers a user's input to the PoC UE 10. In particular, a function is required which can select groups and request an ad-hoc session through the user interface 404. The data transceiver 410 can include transport protocol stacks for transmitting and receiving packet data. The data transceiver 410 can include a RTP/RTCP/FTP stack, UDP/TCP stack, IP stack and lower layer stack.

The present invention pertains to technology for opening an ad-hoc PoC session for a call target group including a plurality of individual PoC users and at least one PoC group when a conference session for an OMA PoC group call service is opened. In particular, the present invention provides a method capable of opening a general PoC group session such that a group ID mapped to a call target group is not limited to a home network domain of a PoC server for opening an ad-hoc session.

Further, the present invention provides a method for opening an ad-hoc PoC session in a PoC system in which a PoC server for managing an ad-hoc group session can receive associated group information when a group URI is managed in a network domain different from that of a group session initiator when a PoC ad-hoc group session including a plurality of single and group URIs is opened. For this, the present invention proposes the following four methods.

First, there is provided a method for acquiring a group list by determining whether a target group URI is included in a home network when an ad-hoc group session including a plurality of single and group URIs is requested.

Second, there are provided a method and procedure for acquiring a group list from a PoC XDMS of an associated domain using the SIP technology when a group URI belongs to a remote network domain.

Third, there is provided a method for notifying that a CF server of an ad-hoc session is located in a network at a transmitting side and a session for an associated group URI is opened in a remote network when client list information is acquired from the remote network.

Fourth, there are provided a method and procedure for performing a connection to a prearranged ad-hoc session when a session open request is sent to an associated server since conference information and information about a server for opening the ad-hoc session are stored and managed in a server of a remote network.

An ad-hoc session including a general group URI accommodates a function of the conventional PoC system using a basic procedure. However, there is a problem in that the PoC server for performing the CF cannot directly acquire group list information from a PoC XDMS belonging to a remote network domain. The present invention is a technical solution for addressing such a problem.

Figure 5:
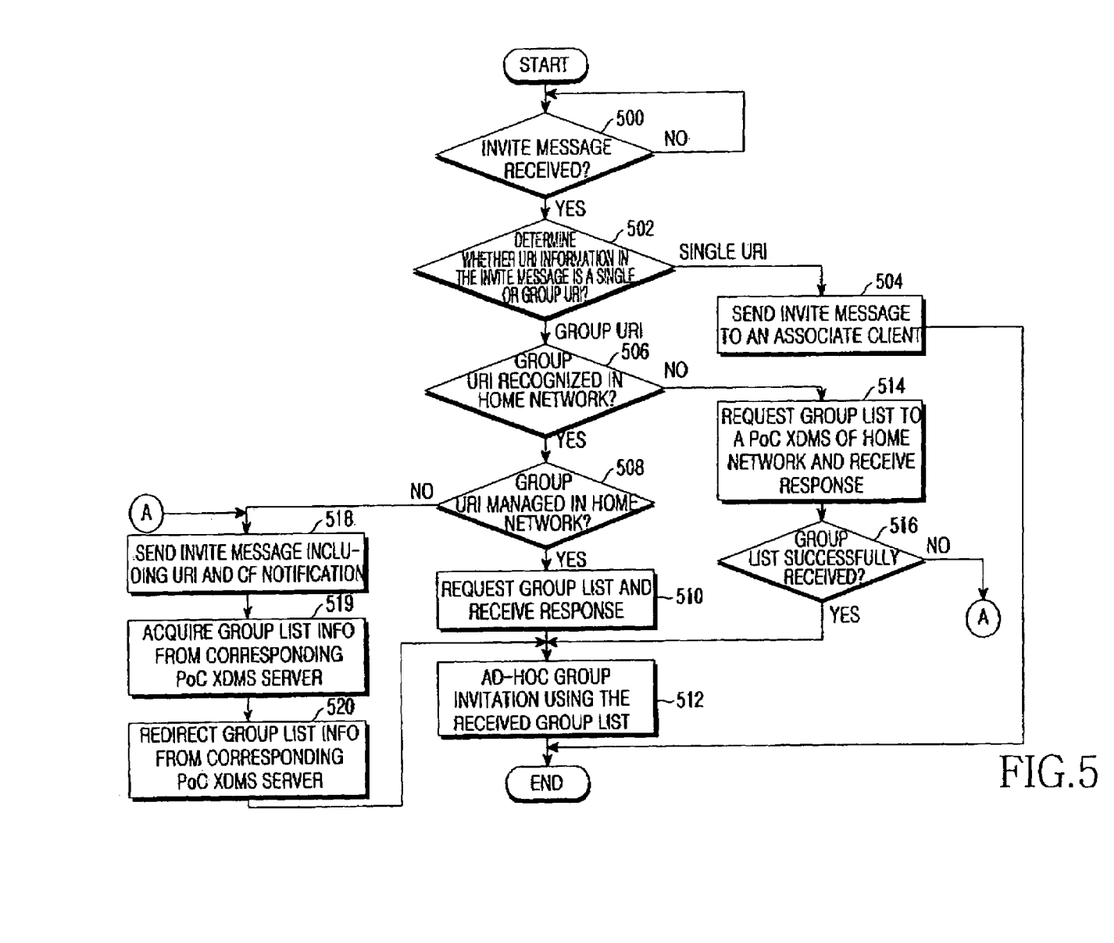
FIG. 5 is a flowchart illustrating a process for opening the ad-hoc PoC session including the plurality of single or group URIs in the ad-hoc PoC group server in accordance with the present invention.

FIG. 5 is a flowchart illustrating a process for opening an ad-hoc PoC session including a plurality of single and group URIs in an ad-hoc PoC group server in accordance with the present invention. In FIG. 5, the PoC server performs both the CF and PF because it opens an ad-hoc session.

First, when receiving a session INVITE message in step 500, the PoC server proceeds to step 502 to determine whether URI information contained in the received session INVITE message is a single or group URI.

If the URI information is the single URL as a determination result, the PoC server proceeds to step 504 to send a general session INVITE message to an associated client. However, if the URI information is the group URL as the determination result, the PoC server proceeds to step 506 to determine whether the associated group URI is recognized in a home network.

If the group URI is not recognized in the home network as a determination result in step 506, the PoC server proceeds to step 514 to send a group list information request to a PoC XDMS of the home network and receive a response. When the list information response fails in step 516, the PoC server proceeds to step 518 to transfer a session INVITE message containing an associated group URI and CF notification to the SIP/IP core network. In step 516, an associated PoC server receiving the session INVITE message acquires a group list mapped to the group URI from a PoC XDMS connected to its network domain. When acquiring the group list mapped to the group URI, the associated PoC server sends the group list to the CF entity in step 520.

After receiving the group list information from the network domain in which the associated group URI is managed in step 520, the PoC server proceeds to step 512 to make an ad-hoc group invitation using the received group list.

If the group URI is recognized in the home network as the determination result in step 506, the PoC server proceeds to step 508 to determine whether the group URI is managed in the home network.

If the group URI is managed in the home network, the PoC server sends a group list request to the XDMS within a home network domain mapped to its network and receives a response in step 510. Then, the PoC server proceeds to step 512 to make a group invitation according to acquired group list information.

If the group URI is not managed in the home network as a determination result in step 508, the PoC server proceeds to step 518 to transfer a session INVITE message containing an associated group URI and CF notification to the SIP/IP core network. After the group list information is received in a network domain in which the associated group URI is managed in step 520, an ad hoc group invitation is created.

In steps 506 and 508, the PoC server can determine whether the group URI is recognized and managed in the home network using a format and domain name of the associated URI. Because the determination as to whether the group URI is managed using the URI format is not directly related to the present invention, its detailed description is omitted.

In the above-described process, the PoC server (CF1) can send a request for member list information mapped to the group URI to the PoC XDMS for managing a PoC group list of the home PoC network. However, if group list information is not acquired because the group URI belongs to a remote network domain, a session INVITE message containing an associated group URI is forwarded to the SIP/IP core network. The session INVITE message is sent to the PoC server (CF2) for hosting the group URI through the SIP/IP core network of the remote network.

Then, the PoC server (CF2) within the remote network requests list information mapped to the group URI through the PoC XDMS belonging to the associated network.

The PoC server (CF2) determines that it does not serve as the CF entity for a session through an "isfocus" option tag contained in the received session INVITE message and then returns the requested group list information to the PoC server (CF1) through a redirect message.

Upon receiving the group list information, the PoC server (CF1) sends an ad-hoc group session request message to a target client of an ad-hoc group included in the group list information.

The PoC server (CF1) includes session initiator information, a conference URI, and a URI type (i.e., an adhoc group) as well as the tag of "isfocus" and an address of the PoC server (CF1) in the session INVITE message and sends the session INVITE message to the PoC server (CF2). Upon receiving the session INVITE message from a PoC client that has already participated in the session, the PoC server (CF2) stores information contained in the session INVITE message and sends the acquired group list information to the PoC server (CF1) such that a requested session can be opened.

When receiving a session participation request message from a client belonging to a group list, the PoC server (CF2) redirects, to the associated client, information about the stored address of the PoC server serving as the conference server and the conference URI, such that the session participation request message can be sent to the associated conference server. Further, when receiving the session participation request message from the client belonging to the group list, the PoC server (CF2) immediately forwards a session connection message to the conference server using the stored information such that the client can participate in an ad-hoc group session.

Figure 6:
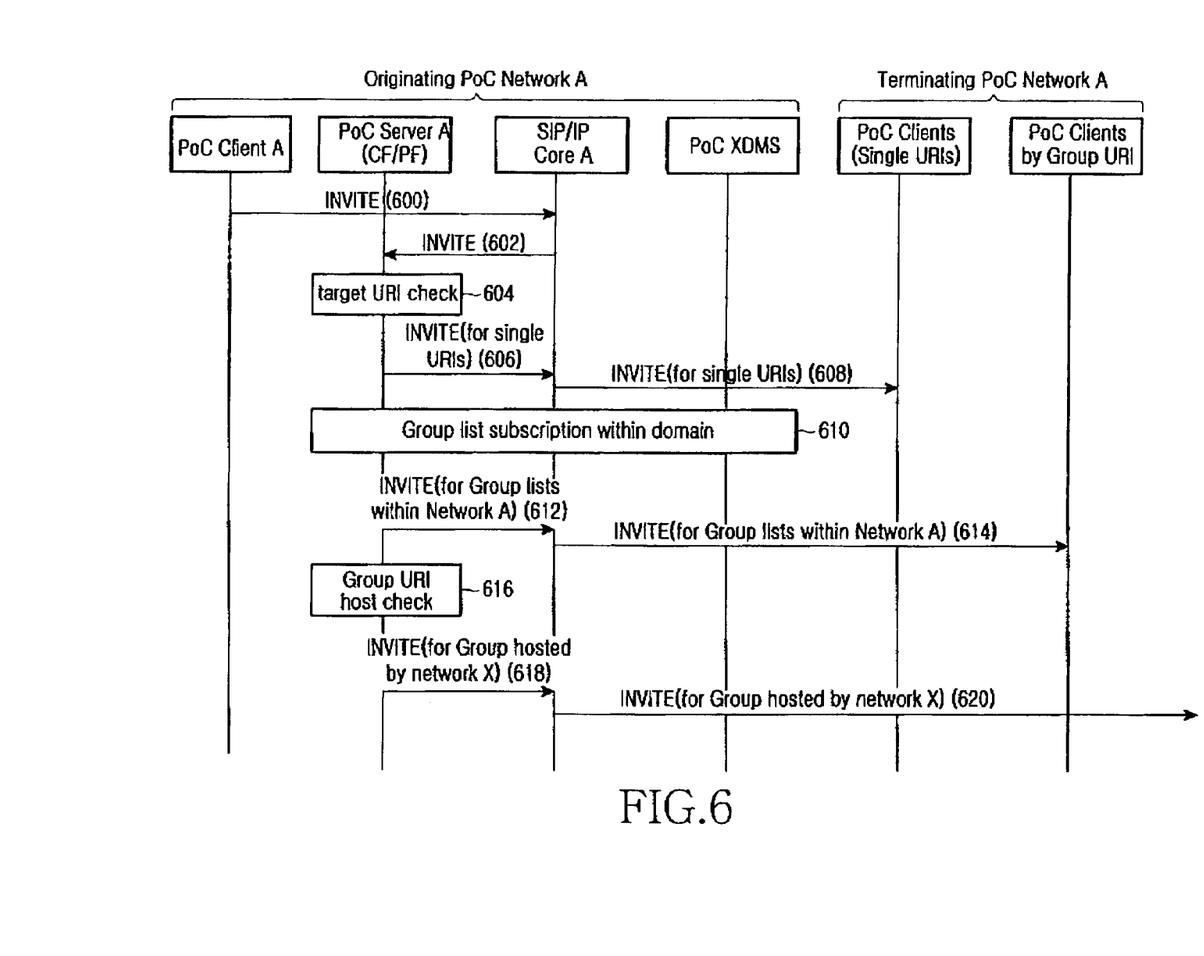
FIG. 6 is a signal flow diagram illustrating a process for opening an ad-hoc PoC session in an originating PoC network in accordance with the present invention.

FIG. 6 illustrates a procedure between a PoC client A at the transmitting side for opening an ad-hoc session, a PoC server A and a PoC XDMS.

The PoC client A sends a session INVITE message for opening the ad-hoc session to the PoC server through an SIP/IP core network in steps 600 and 602. The PoC client A sends the session INVITE message containing single and group URIs on the basis of conference establishment using request-contained lists in the SIP according to the conventional Internet Engineering Task Force (IETF) technology. Each group URI can include information of a group type parameter (of session="1-1", "prearranged" or "group") according to setting within a UE.

When receiving the session INVITE message, the PoC server A within the home network operates as the CF entity after receiving an ad-hoc group session open request and checks a target URI inserted as a Multipurpose Internet Mail Extensions (MIME) parameter in step 604. The PoC server A checks the group type parameter and determines whether the associated URI is recognized and managed in the home network domain.

If the target URI is single URIs as a determination result, the PoC server sends the session INVITE message to clients mapped to the single URIs in steps 606 and 608.

If the target URI is a group URI, the PoC server A acquires a group URI list from the XDMS of the home network in step 610 and makes an ad-hoc group invitation using the group list in steps 612 to 614.

However, if the target URI is a group URI incapable of being supported by the home network, the PoC server checks a host of the group URI in step 616 and sends a session INVITE message to an associated server X in steps 618 and 620. At this time, the sent session INVITE message contains a PoC conference URI generated from the PoC server A and an "isfocus" header value as well as an associated URI in a contact header and further includes address information of the CF A. Herein, the "isfocus" header value indicates the conference server for hosting the ad-hoc session. Further, the session INVITE message can additionally include a URI parameter of "session=adhoc" for indicating a session type in the PoC conference URI. In the session INVITE message, an MIME body can include information of a list of clients included in an ad-hoc group, for example, a single URI and information of a list of clients belonging to a group within a home domain.

Then, the PoC server A can reuse an initial session open field value relative to an answer mode requested by the PoC client A and a nickname and address information of a PoC client at the transmitting side when acquiring group list information from a network X at the receiving side and sending the session INVITE message.

Figure 7:
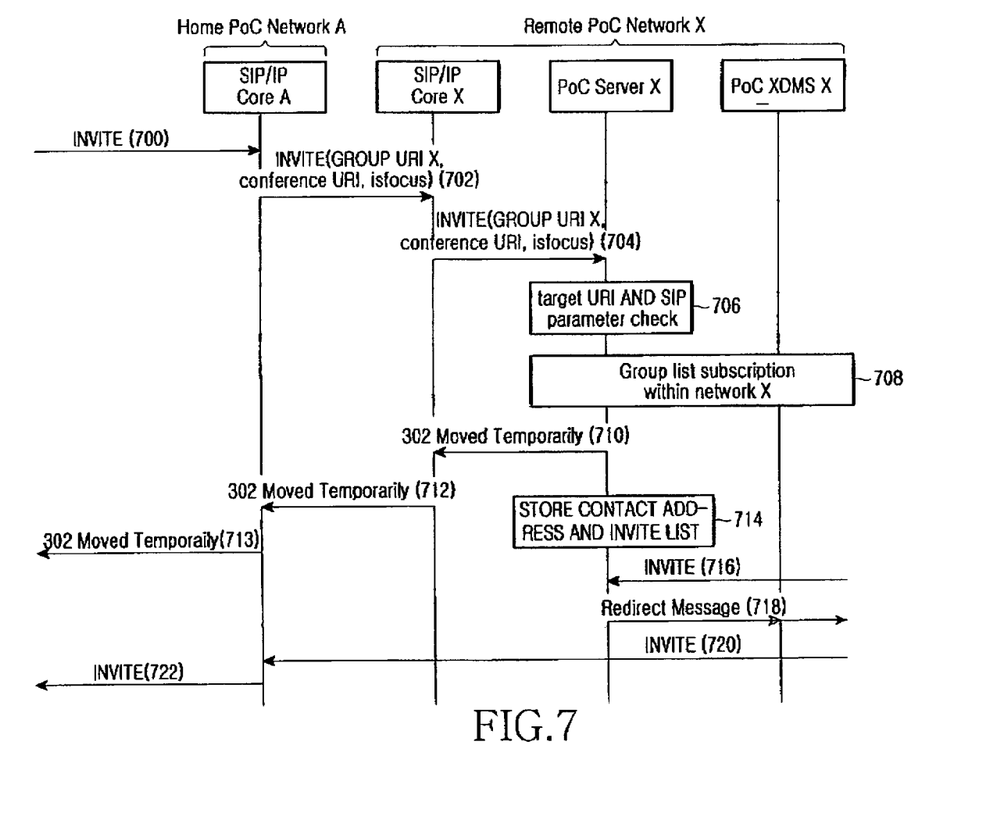
FIG. 7 is a signal flow diagram illustrating a process for opening an ad-hoc PoC session in a terminating PoC network in accordance with the present invention.

With reference to FIG. 7, a signal flow for opening an ad-hoc group session will be described when the network X at the receiving side for receiving the session INVITE message sends list information mapped to an associated group URI to the PoC server A as illustrated in FIG. 6.

When receiving the session INVITE message routed through the SIP/IP core networks A and X in steps 702 and 704, the PoC server X checks a target URI and parameters included in the session INVITE message in step 706. Then, the PoC server X acquires a group list mapped to a PoC group URI corresponding to the target URI included in the session INVITE message from the PoC XDMS within its domain in step 708.

When receiving the session INVITE message, the PoC server X determines that it is a host server for the group URI. The PoC server X serving as a conference server may generate a conference URI. However, in the present invention, the PoC server X determines that the CF A is the CF for the ad-hoc session when receiving the session INVITE message containing a session type URI parameter included in an "isfocus" option tag or a conference URI. In steps 710 to 713, the PoC server X sends, to the CF A, a redirect message containing the associated group URI list acquired in step 708. That is, the PoC server X for hosting a group for receiving the session INVITE message redirects the group list information when determining that it does not serve as the conference server according to reception of the "isfocus" option tag of the contact header within the message.

On the other hand, the group URI list can be transmitted in an MIME body of a "302 Moved Temporarily" message.

After performing steps 702 to 713, the PoC server X can store information about an associated ad-hoc group session and can transfer information for opening an ad-hoc session and inviting a list in a different domain to a client making a request when another session INVITE message for a group URI X is received. At this time, group URI information to be sent to the conference server includes information such as a conference URI of the CF A, an address of the PoC server A and list information of an ad-hoc group session.

When receiving a session participation request (or INVITE) message from a client mapped to the group URI in step 716, the PoC server X sends a redirect message containing the address information of the PoC server A serving as the conference server and information of an ad-hoc group conference URI stored in step 714 to the client that has sent the session participation request message. When receiving the redirect message, the client sends the session participation request message to the ad-hoc group conference server using the conference URI information contained in the redirect message in steps 720 and 722. In another method, the PoC server X can participate in an ad-hoc group session by directly forwarding, to the PoC server A, a received INVITE signal in place of the redirect message of step 718.

After receiving a URI of a group member from the PoC server X, the PoC server A checks the maximum number of allowable ad-hoc group members according to service rule. When the number of ad-hoc group members exceeds the maximum number of allowable ad-hoc group members, the following two procedures can be performed. First, an INVITE message may not be sent to all URIs of an associated group. That is, when sequentially receiving a URI of each group member in relation to multiple group URIs belonging to a different network domain, the INVITE message is sent only for member URIs received within the number of allowable ad-hoc groups. When the number of ad-hoc groups starts to exceed the number of allowable ad-hoc groups, the INVITE message may not be sent to all groups of received group member URIs. Until the number of ad-hoc groups exceeds the number of allowable ad-hoc groups, the INVITE message can be sent for group member URIs in order included in a redirect message.

FIG. 8 illustrates the format of the session INVITE message in step 600 of FIG. 6.

First, the session INVITE message contains information for indicating a PoC service by inserting "+g.poc.talkburst" into the $9^{th}$ line of a header and information for indicating a transmission of an MIME type client list by inserting "Require: recipient-list-invite" into the $13^{th}$ line of the header. Also, an MIME body containing single and group URIs as well as a Session Description Protocol (SDP) parameter offer is included and transferred in the session INVITE message. Each URI includes a session type parameter. The single and group URIs are shown on the $8^{th}$ to $12^{th}$ lines of a list part of the body. In FIG. 8, it is assumed that member lists of SKT and KTF mapped to group URIs can be collected from the XDMS of the home network A and a member list of TMO can be managed in a remote network rather than the home network.

When receiving the session INVITE message as illustrated in FIG. 8, the PoC server A checks single and group URI information and sends a session INVITE message for sending a request for group list information about a TMO group incapable of being collected from the home network to an associated network X.

Figure 9:
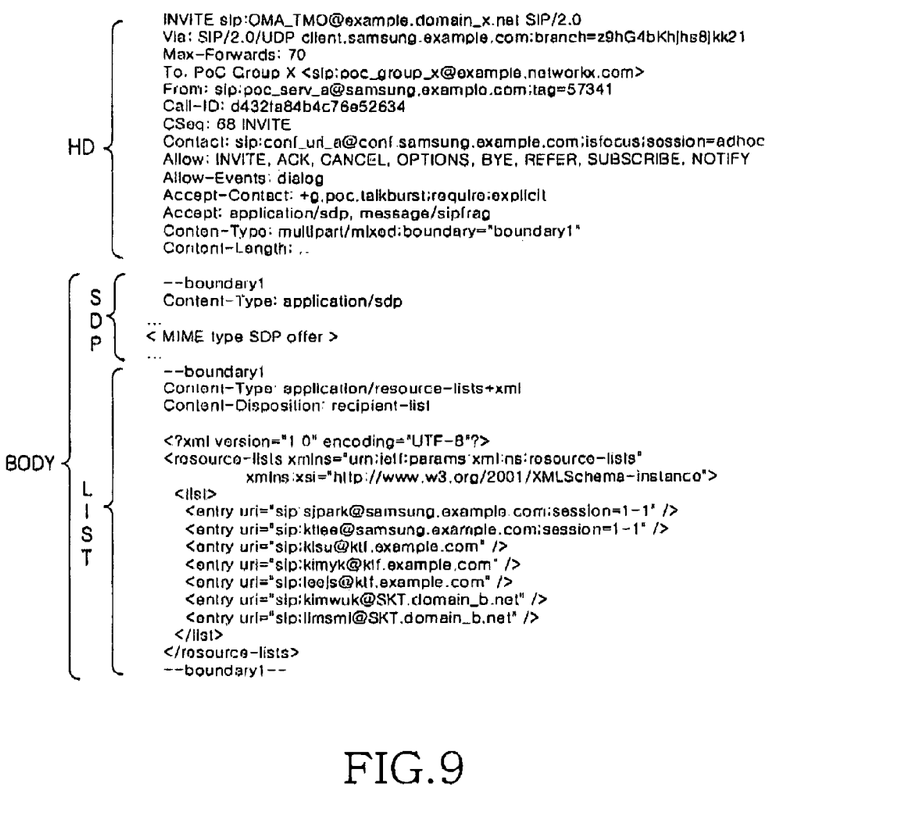
FIG. 9 illustrates an example of the format of an SIP INVITE message for opening the ad-hoc PoC session in FIG. 7.

FIG. 9 illustrates an example of the format of the session INVITE message sent from the PoC server A to the PoC server X in steps 700 to 704 of FIG. 7.

Request_URI is set to a URI of a "TMO" group in the first line of a header of the session INVITE message and "Contact: sip: conf_uri_a@conf.Samsung.example.com;isfoucus; session=adhoc" is inserted into a contact header of the $8^{th}$ line, such that conference URI information, focus information and session type information can be transferred to the PoC server X. Further, client list information capable of being collected from the home network of the PoC server A can be selectively included in a list part of a message body as in the $8^{th}$ to $14^{th}$ lines thereof. The list information can be transferred which includes list information within the home network, such that participant information of an ad-hoc group can be transferred to clients at a receiving side and therefore participation in the ad-hoc group can be decided.

When receiving the session INVITE message as illustrated in FIG. 9, the PoC server X acquires list information mapped to an associated group URI from a PoC XDMS X, and sends a message containing the acquired information to the PoC server A.

Figure 10:
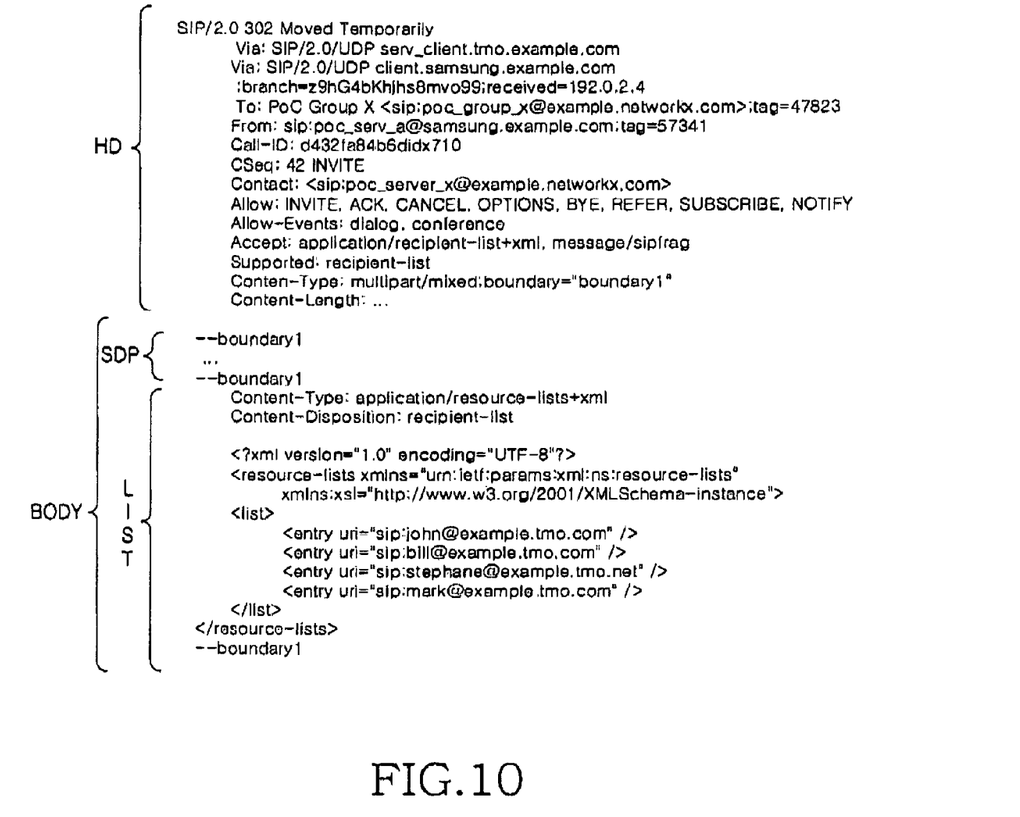
FIG. 10 illustrates an example of the format of a message for sending a group list mapped to an associated group URI to a home network in FIG. 7.

FIG. 10 illustrates an example of the format of the "302 Moved Temporarily" message sent in steps 710, 712 and 713 of FIG. 7. Referring to FIG. 10, the PoC server X redirects, to the PoC server A, the "302 Moved Temporarily" message in which list information regarding a group URI "OMA_TMO@example.domain_x.net" is included in the $8^{th}$ to $11^{th}$ lines of a list part of a message.

The present invention can address a problem when a session open request is made by individually inputting ad-hoc group targets after collecting group information in an XCAP or SIP SUBSCRIBE method when an ad-hoc group session including a plurality of groups is opened. In the present invention, a server side can automatically open a session without directly collecting a list of clients belonging to a remote network other than a home network, to enhance user convenience and promote efficient use of network resources.

Although the preferred embodiments of the present invention have been disclosed for illustrative purposes, those skilled in the art will appreciate that various modifications, additions, and substitutions are possible, without departing from the scope of the present invention. Therefore, other possible embodiments and modifications without departing from the principle of the present invention may fall into the protected scope of the present invention.

What is claimed is:

1. A method for opening an ad-hoc Push-To-Talk (PTT) over Cellular (PoC) session in a PoC system, including a first PoC server and a second PoC server, comprising the steps of:
   receiving, by the first PoC server, a session INVITE message from a PoC client requesting session initiation, the session INVITE message including information of at least one group identifier;
   checking, by the first PoC server, the at least one group identifier included in the session INVITE message received by the first PoC server;
   sending a group list information request message including the at least one group identifier and a value indicating a conference server, from the first PoC server, to the second PoC server hosting a group list corresponding to the group identifier; and
   receiving group list information, at the first PoC server, from the second PoC server, in response to the group list information request message.

2. The method of claim 1, wherein the request message sent to the second PoC server further comprises at least one of a PoC conference Uniform Resource Identifier (URI) generated from the first PoC server, a URI parameter, address information of a Controlling PoC Function (CF), and URI type information.

3. The method of claim 2, wherein the URI parameter indicates a session type in a PoC conference URI.

4. The method of claim 1, wherein the session INVITE message further includes at least one single identifier.

5. The method of claim 4, further comprising the step of checking whether the at least one single identifier is hosted by the first PoC server.

6. The method of claim 1, wherein the value indicates that the first PoC server is a conference server.

7. The method of claim 1, wherein the value includes an "isfocus" header value indicating a conference server for hosting the ad-hoc session.

8. The method of claim 7, wherein the conference server performs a Controlling PoC Function entity for managing a talk burst of an opened session.

9. The method of claim 1, further comprising the step of storing the group list information.

10. A method for transmitting and receiving messages in the system including a first server and a second server, comprising the steps of:
    receiving, by the first server, a first message from a terminal device requesting session initiation, the first message including at least one group identifier;
    checking, by the first server, the at least one group identifier included in the first message received by the first server;
    sending a second message including the at least one group identifier and a value indicating a conference server, from the first server, to the second server hosting a group list corresponding to the group identifier; and
    receiving group list information, at the first server, from the second server, in response to the second message.

11. A Push-To-Talk (PTT) over Cellular (PoC) server for opening an ad-hoc PoC session in a PoC system, comprising:
    a data transceiver receiving a session INVITE message including information of at least one group identifier from a PoC client; and a PoC session controller checking the group identifier information within the session INVITE message and sending a group list information request message including the at least one group identifier and a value indicating a conference server to an external network hosting a group list corresponding to the group identifier, wherein the data transceiver receives group list information from the external network in response to the group list information request message.

12. The PoC server in claim 11, wherein, the PoC session controller requests the group list information request message to the external network if the checking result is that the group identifier is hosted by the external network.

13. The PoC server in claim 12, wherein the PoC session controller checks whether the at least one single identifier is hosted by the first PoC server.

14. The PoC server in claim 11, wherein the session INVITE message further includes at least one single identifier.

15. The PoC server in claim 11, wherein the value indicates that the external PoC server is a conference server.

16. The PoC server in claim 11, wherein the value includes an "isfocus" header value indicating a conference server for hosting the ad-hoc session.

17. The PoC server in claim 16, wherein the conference server performs a Controlling PoC Function entity for managing a talk burst of an opened session.

18. The PoC server in claim 11, wherein the request message sent to the external PoC server further comprises at least one of a PoC conference Uniform Resource Identifier (URI) generated from the PoC server, a URI parameter, address information of a Controlling PoC Function (CF), and a URI type information.

19. The PoC server in claim 18, wherein the URI parameter indicates a session type in a PoC conference URI.

20. A Push-To-Talk (PTT) over Cellular (PoC) server for opening an ad-hoc PoC session in a PoC system, comprising:

a data transceiver receiving a group list information request message including at least one group identifier and a value indicating a conference server from a home network, wherein the at least one group identifier is provided in a session INVITE message from a PoC client, and received by a PoC session controller of the home network; and a PoC participating function generating group list information corresponding to the at least one group identifier in response to the group list information request message, wherein the data transceiver transmits group list information to the PoC session controller of the home network.

21. The PoC server in claim 20, wherein the data transceiver transmits the acquired group list information to the external PoC server.

22. The PoC server in claim 20, wherein the PoC session controller acquires the group list information from a PoC XML Document Management Server.

* * * * *